(12) United States Patent
Shimamura

(10) Patent No.: US 8,139,271 B2
(45) Date of Patent: Mar. 20, 2012

(54) PRINTING APPARATUS FOR PRINTING IN ACCORDANCE WITH A STORED OR A SET PRINT CONDITION AND CONTROL METHOD THEREFOR

(75) Inventor: Yoshiyuki Shimamura, Yokohama (JP)

(73) Assignee: Canon Kabushiki Kaisha, Tokyo (JP)

(*) Notice: Subject to any disclaimer, the term of this patent is extended or adjusted under 35 U.S.C. 154(b) by 947 days.

(21) Appl. No.: 11/144,658

(22) Filed: Jun. 6, 2005

(65) Prior Publication Data

US 2005/0270556 A1 Dec. 8, 2005

(30) Foreign Application Priority Data

Jun. 4, 2004 (JP) .................................. 2004-167590

(51) Int. Cl.
*H04N 1/21* (2006.01)
(52) U.S. Cl. ....................................................... 358/296
(58) Field of Classification Search .................. 358/296, 358/1.15
See application file for complete search history.

(56) References Cited

U.S. PATENT DOCUMENTS

| | | | | |
|---|---|---|---|---|
| 5,606,420 A * | 2/1997 | Maeda et al. | ................. | 358/296 |
| 5,734,915 A * | 3/1998 | Roewer | ......................... | 715/202 |
| 6,082,852 A * | 7/2000 | Soga et al. | ...................... | 347/86 |
| 6,097,497 A * | 8/2000 | McGraw | ...................... | 358/1.12 |
| 6,456,391 B1 * | 9/2002 | Miyamoto et al. | ............ | 358/1.18 |
| 6,744,529 B2 * | 6/2004 | Winter et al. | ................ | 358/1.15 |
| 7,038,714 B1 * | 5/2006 | Parulski et al. | ............ | 348/207.2 |
| 7,456,979 B2 * | 11/2008 | Nakatsu et al. | ................ | 358/1.1 |
| 2003/0107651 A1 * | 6/2003 | Chen et al. | ................. | 348/207.2 |
| 2003/0214602 A1 * | 11/2003 | Battles et al. | ................ | 348/375 |
| 2005/0111034 A1 * | 5/2005 | Karasaki et al. | ............ | 358/1.15 |
| 2005/0185205 A1 * | 8/2005 | Eckhaus et al. | .............. | 358/1.13 |

FOREIGN PATENT DOCUMENTS

| | | |
|---|---|---|
| JP | 8-067047 A | 3/1996 |
| JP | 11-018033 | 1/1999 |
| JP | 11-249862 A | 9/1999 |
| JP | 2000-118103 A | 4/2000 |
| JP | 2001-018497 A | 1/2001 |
| JP | 2003-134453 A | 5/2003 |

OTHER PUBLICATIONS

Chinese Office Action dated Jun. 9, 2006.
"Print Anytime Anywhere [HP deskjet 450]", PC Magazine Chinese Edition, Jan. 2003, pp. 36 and 37 with complete English translation.

* cited by examiner

*Primary Examiner* — Benny Tieu
*Assistant Examiner* — Jeremiah Bryar
(74) *Attorney, Agent, or Firm* — Fitzpatrick, Cella, Harper & Scinto

(57) ABSTRACT

A printing apparatus and a method of controlling the printing apparatus are provided, which enable the setting of a first mode in which image data received via a wireless interface that wirelessly receives image data from an external apparatus is converted into print image data and is printed under the default print conditions, and of a second mode in which image data received through a wireless interface is displayed on a display apparatus connected to the printing apparatus and is printed according to the print conditions that are set by using a menu screen displayed on the display apparatus and an operational panel of the printing apparatus. In addition, in the case where no display apparatus is connected to the printing apparatus, the printing apparatus prints in the first mode based on the default print conditions.

15 Claims, 8 Drawing Sheets

1    VIEW MEMORY CARD

2    PRINTING SETTING

3    MODE SETTING ~401

4    END

FIG. 5

| | |
|---|---|
| 1 | THE FIRST MODE |
| 2 | THE SECOND MODE ~401 |
| 3 | END |

FIG. 7

| | | | |
|---|---|---|---|
| PRINTING SETTINGS | | | |
| 1 | PAPER SIZE: | A4 | <u>A6</u> |
| 2 | PRINT QUALITY: | HIGH | STANDARD |
| 3 | PRINT STARTS | | |
| 4 | STORE IN MEMORY CARD | | |
| 5 | END | | |

FIG. 8

PRINTING SETTINGS IN THE FIRST MODE

1     PAPER SIZE:     A4     <u>A6</u>

2     PRINT QUALITY:     HIGH     STANDARD

3     STORE

4     END

PRINTING APPARATUS FOR PRINTING IN ACCORDANCE WITH A STORED OR A SET PRINT CONDITION AND CONTROL METHOD THEREFOR

FIELD OF THE INVENTION

The present invention relates to a printing apparatus and a control method therefor, and particularly to a technology for printing image data wirelessly received through a wireless interface, for example, from a mobile device or the like.

BACKGROUND OF THE INVENTION

In general, a printer is connected to a host computer and implements printing, based on print data sent by the host computer. In this case, print conditions in the printer, a paper size, a type of paper, print quality, and the like are set by the user of the host computer and are sent to the printer in the form of commands when printing starts. After receiving the command, the printer interprets the commands, selects a print mode designated through the commands, and then implements printing. Accordingly, in the case of a printer that is mainly connected to a host computer to implement printing, setting operation using a console of the printer, for setting a paper size, a type of paper, a print mode, and the like is not required; recently, a printer having nothing but a power switch on the console has appeared.

In contrast, in the case of a printer that is mainly used being not connected to a host computer, e.g., a printer that can directly obtain image data, without intermediation of a host computer, from a digital camera or a memory card of a digital camera and can print the image data, means for setting print conditions (a paper size, a type of paper, print quality, and the like) in the printer are required. Therefore, in such a printer, in general, an operational panel having various setting keys, a display, and the like is provided.

In recent years, cellular phones and mobile terminals have diversified their functions, and models having a built-in camera and models having even a communicating function through an infrared ray have appeared; meanwhile, printer models have appeared that can transmit and receive through wireless communication such as infrared-ray communication data of pictures taken with such cellular phones having a built-in camera.

In addition, a system has been proposed (in Japanese Laid-Open Patent Publication No. 11-18033), in which both a digital camera and a printer have a communicating function for image data; data of an image taken with the digital camera is sent to the printer; the printer converts the received image data into image data for printing and sends the converted image data back to the digital camera; the digital camera displays on a display a print preview image fed back from the printer, and further sends printing instructions to the printer.

However, the foregoing configuration example requires the digital camera to have dedicated programs for receiving image data from the printer and for outputting print instructions to the printer. In addition, the foregoing configuration example requires the printer to have dedicated programs for transmitting the received image data to the digital camera and for analyzing the print instruction commands sent from the digital camera. Therefore, it is necessary to provide extra functions in both the printer and the digital camera, and the extra functions can be utilized merely between specific apparatuses having the functions.

In the case where a printer receives and prints data not from a host computer but from a digital camera or a mobile terminal, image data is sent from a digital camera or a mobile terminal to the printer through a wireless interface. However, the received image data does not include information on paper on which the image is to be printed and the like. Accordingly, in order to obtain print results desired by a user, it is necessary to provide in the printer an operational panel (console) for selecting paper and a display (UI) that were not required in the conventional connection between a host computer and a printer. However, providing in a printer an operational panel and a display leads to the increased cost of the printer. This is why there comes a demand for connecting to a printer a television receiver that has come into wide use as a display, and for setting print conditions by utilizing the display screen of the television receiver. However, a television receiver is not used always being connected to a printer; thus, there is a request to realize a print function merely with a printer even though the television receiver is not connected to the printer.

SUMMARY OF THE INVENTION

Accordingly, an object of the present invention is to eliminate the aforesaid drawbacks of the prior art.

In addition, the feature of the present invention is to provide a technology with which image data received through a wireless interface can be printed according to print conditions that are set by utilizing a connected display, and with which, even when no display is connected, the received image data can be printed.

According to an aspect of the present invention, there is provided with a printing apparatus comprising:

wireless communication means for receiving image data with a wireless communication from an external apparatus;

operation means that is operated by a user, for setting print conditions by designating a menu item displayed on a display apparatus connected to the printing apparatus;

set means for setting either a first mode in which the image data is printed according to predetermined print conditions, or a second mode in which the image data is printed according to the print conditions set by the operation means;

print image generation means for generating print image data for printing based on the image data in accordance with the first or second mode set by the set means; and print means for printing an image on a recording medium based on the print image data generated by the print image generation means.

According to another aspect of the present invention, there is provided with a control method of a printing apparatus, comprising:

a reception step of receiving image data with wireless communication from an external apparatus;

a print condition setting step of setting print conditions by designating a menu item displayed on a display connected to the printing apparatus;

a set step of setting either a first mode in which the image data is printed based on predetermined print conditions, or a second mode in which the image data is printed according to the print conditions set in the print conditions setting step;

a print image generation step of generating print image data for printing based on the image data in accordance with the first or second mode set in the set step; and a print step of printing an image on a recording medium based on the print image data generated in the print image generation step.

The feature can be achieved by the combination of features described in the independent claims, and the dependent claims are to specify merely advantageous illustrative embodiments of the present invention.

The gist of the present invention is not an enumeration of all the necessary features thereof, and therefore combinations of these features are also covered by the present invention.

Other features, objects and advantages of the present invention will be apparent from the following description when taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 5 depicts a view illustrating an example of a mode-setting screen displayed on the screen of the television receiver;

FIG. 7 depicts a view illustrating an example of a printing setting screen displayed on a television receiver, in the step S26 in FIG. 6; and FIG. 8 depicts a view illustrating an example of a mode-setting screen displayed on the screen of a television receiver.

DETAILED DESCRIPTION OF THE PREFERRED EMBODIMENTS

Hereinafter, preferred embodiment of the present invention will be described in detail, with reference to the accompanying drawings. The embodiment described below does not limit thereto the invention according to the claims, and the combination of all features described in the present embodiment is not requisite to solving means of the invention.

Figure 1:
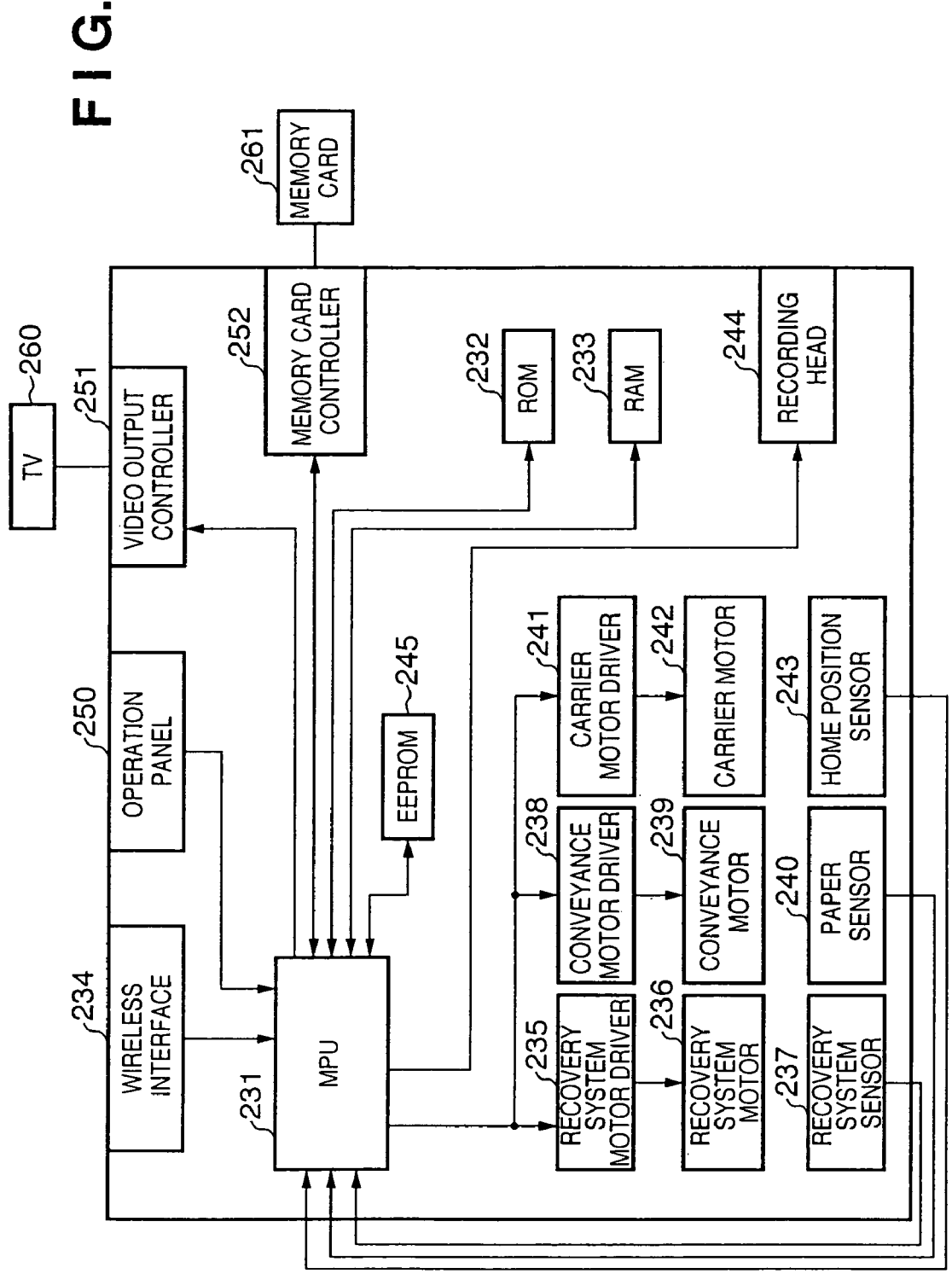
FIG. 1 is a block diagram showing an example of the configuration of a printer according to an embodiment of the present invention.

FIG. 1 is a block diagram showing the configuration example of a printer according to the embodiment of the present invention.

A microprocessor unit MPU 231 controls the entire operation of the printer and implements control operation according to control programs stored in a ROM (read only memory) 232. A RAM (random access memory) 233 is utilized as a work area when the MPU 231 implements the control programs, and is utilized for temporarily storing various types of data, image files, and the like. While confirming presence of recording paper, the position of the carriage, the status of the recovery system unit, based on signals from sensors such as a paper sensor 240, a home position sensor for a carrier (a home sensor, hereinafter) 243, a recovery system sensor 237 and the like, the MPU 231 supplies driving pulses with a conveyance motor driver 238, a carrier motor driver 241, and a recovery system motor driver 235, thereby controlling the rotations of a conveyance motor 239, a carrier motor (carriage motor) 242, and a recovery system motor 236. The conveyance motor 239 is designed to convey a recording paper through its rotation. The carrier motor 242 makes a carriage equipped with a recording head 244 travel in forward and reverse directions. In the case where the recording head 244 is an ink-jet head, the recovery system motor 236 is driven in the recovery processing of sucking ink from the nozzle of the recording head 244 and cleaning the head.

A wireless interface 234 is utilized for receiving a file to be printed, commands for printing, image data, and the like that are sent with wireless from a host computer, a mobile device (not shown) or the like. In the case where the received file to be printed is an image file such as a JPEG-format image file, the MPU 231 decodes the JPEG-format image file to generate image data, and then supplies the image data to a video output controller 251. The video output controller 251 converts the image data into a video signal that is outputted to and displayed on, for example, a television receiver 260 connected to the video output controller 251. In addition, menu image data (stored in ROM 232) for an operational guide is also supplied to the video output controller 251 so that print conditions such as a paper size, a type of paper, print quality, and the like can be set using the television receiver 260. Accordingly, by connecting the video output controller 251 with the home-use television receiver 260, and while viewing the screen, the user can set print conditions such as a size of paper used for printing, a type of paper, print quality and the like. As described later, an EEPROM 245 is a memory for nonvolatilely storing the print conditions that has been set by means of the screen of the television receiver 260, and the like.

An operation panel 250 whose configuration is described later with reference to FIG. 2 has cursor keys, a SET key and the like; the print conditions can be set by operating these keys of the operation panel 250, while viewing a menu screen displayed on the television receiver 260.

A recording head 244 is, for example, an ink-jet head and prints images with color ink, according to print data supplied by the MPU 231. In addition, a memory card controller 252 connects thereto a memory card 261 in which image data shot by a digital camera or the like is stored, and writes data in or reads out data from the memory card 261, according to instructions from the MPU 231.

Figure 2:
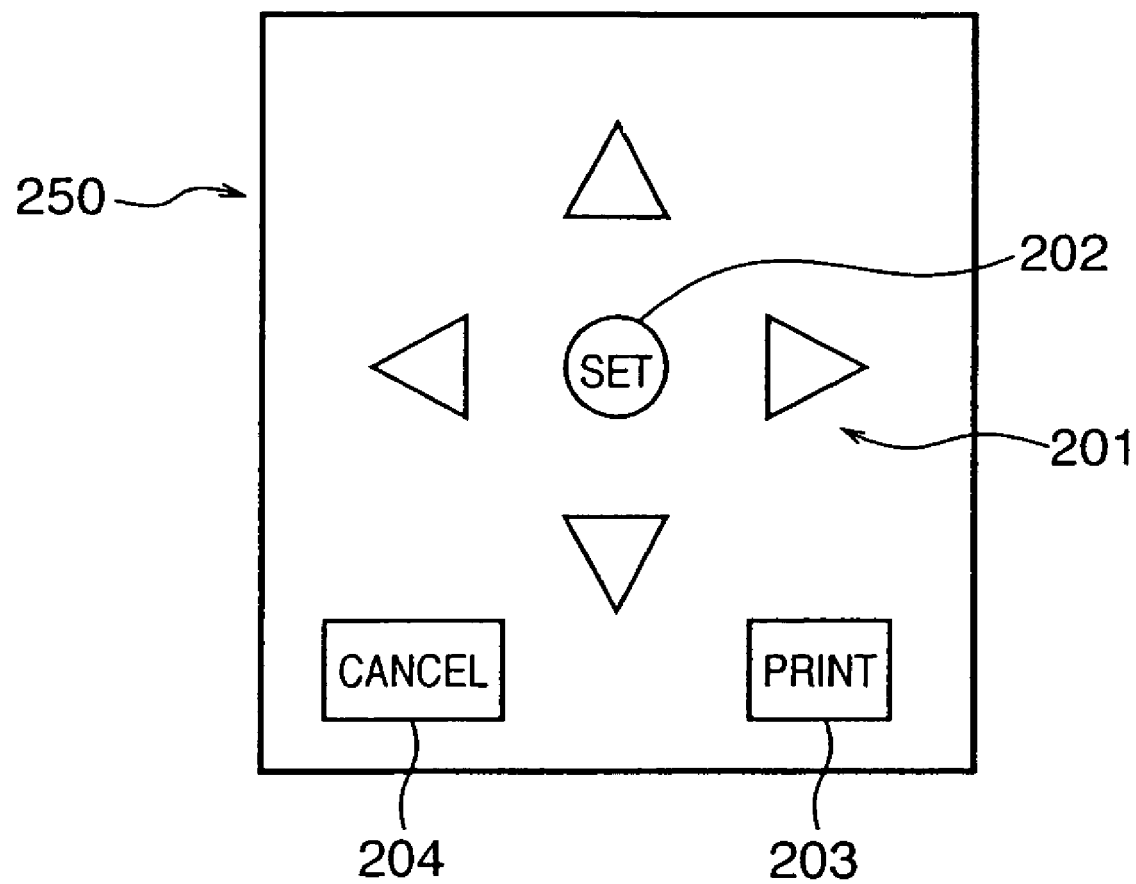
FIG. 2 depicts a view for explaining the arrangement of the keys on an operational panel according to the present embodiment.

FIG. 2 depicts a view of an example of an arrangement of the keys of the operation panel 250 according to the embodiment.

A reference numeral 201 denotes four respective cursor keys that respectively instruct cursor motions in the left, right, top, and bottom directions, in response to pressing respective cursor keys 201, for example, a cursor displayed on the television receiver 260 moves in an instructed direction by the cursor key. A SET key 202 is an instruction key for setting the menu selected by means of the cursor. A reference numeral 203 denotes a PRINTING SETTING key for making a printing setting screen (FIG. 7) to be displayed. A CANCEL key 204 is a key for canceling print conditions and the like instructed on the screen.

Figure 3:
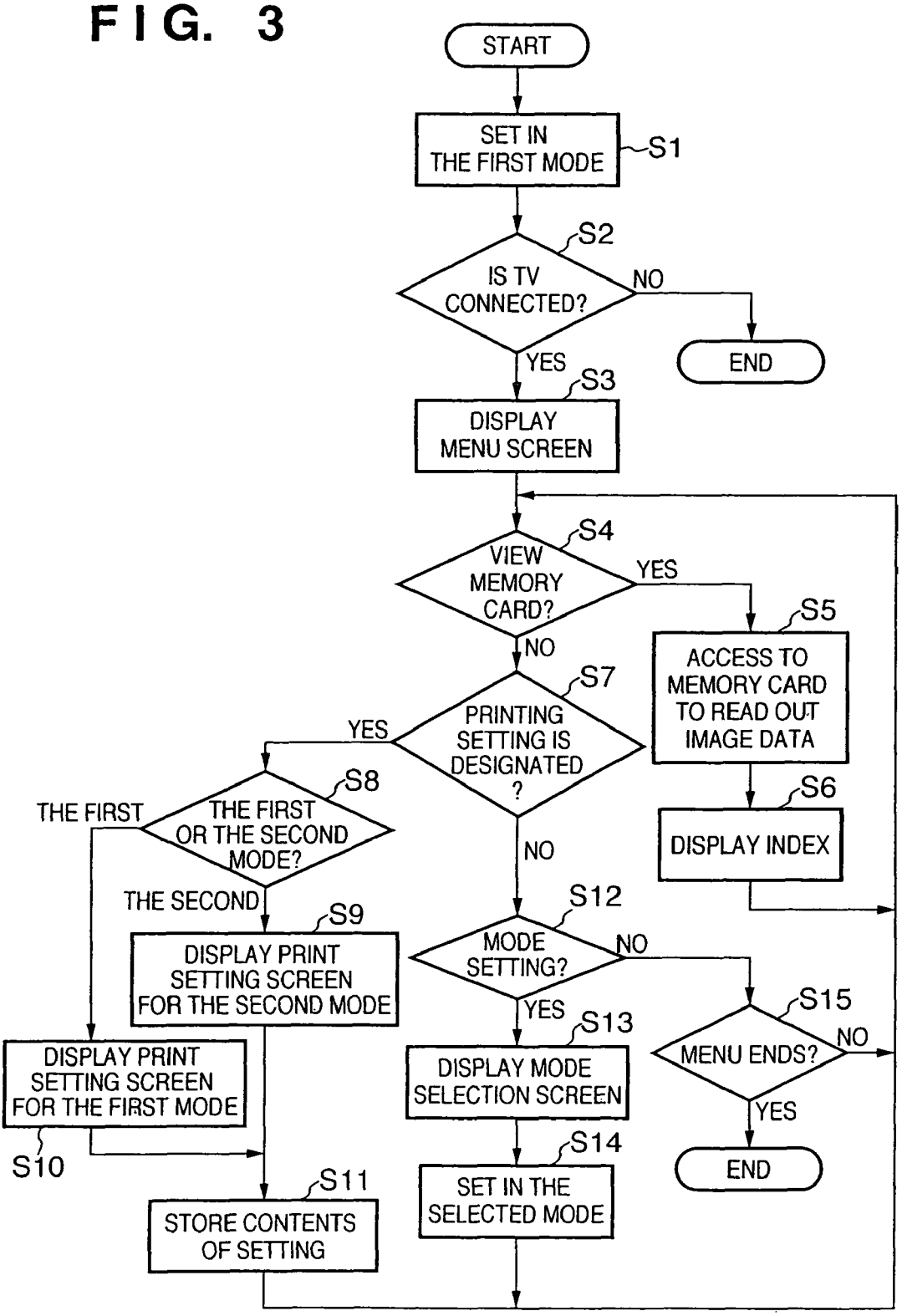
FIG. 3 is a flowchart for explaining the process of the printer according to the embodiment.

FIG. 3 is a flowchart for explaining processing in the printer according to the embodiment. The program for implementing the processing is stored in the ROM 232 and implemented under the control of the MPU 231.

The processing is initiated by turning on an electric power supply of the printer according to the present embodiment. In the step S1, the mode of the printer is set to a first mode. In the first mode, when print data is received from an external device (such as a host), printing is implemented according to the print conditions set by default in the printer. Subsequently, in the step S2, it is determined whether or not the television receiver 260 is connected through the video output controller 251. When it is determined that the television receiver 260 is not connected, the processing ends. In the case where the television receiver 260 is not connected, the setting of print modes using the television receiver can not be implemented, but the print operation in the first mode can be implemented under the default print conditions (refer to FIG. 6). Meanwhile, in the step S2, it is determined that the television receiver 260 is connected, the process is advanced to step S3, then a menu screen, for example, such as illustrated in FIG. 4 is displayed on the television receiver 260.

Figure 4:
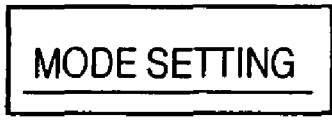
FIG. 4 depicts a view illustrating an example of a menu-screen displayed on the screen of a television receiver.

FIG. 4 depicts a view illustrating an example of a menu-screen displayed on the screen of the television receiver 260.

The menu screen includes "item 1" for designating viewing contents of the memory card 261 connected through the memory card controller 252, "item 2" for designating to set print conditions, "item 3" for designating to set print mode, and "item 4" for terminating the display of the menu screen.

Subsequently, the process is advanced to step S4, and it is determined whether or not the item 1 "view contents of memory card" in the menu screen is selected. When it is determined that "view contents of memory card" is selected, the step S4 is followed by the step S5, and then the image file stored in the memory card 261 is read out through the memory card controller 252. Subsequently, in the step S6, the indices of the read out images are displayed on the television receiver 260, and then the process is returned to the step S4. In this situation, when an index image may be designated, the image corresponding to the index image may be magnified and displayed.

On the other hand, in the step S4, it is determined that "view contents of memory card" is not selected, the step S4 is followed by the step S7, and it is determined whether or not the item 2 "instruct to set print conditions" has been selected. In the case where the item 2 is selected, the step S7 is followed by the step S8, and it is determined whether the mode being set at the time point is the first mode or a second mode. In the case where the first mode has been set, the process is advanced to step S10, and the first-mode print-setting screen is displayed on the screen of the television receiver 260. On the other hand, in the case where the second mode is set, the process is advanced to step S9, and the second-mode print-setting screen is displayed on the screen of the television receiver 260. The printing setting screen to be displayed in these situations may be, for example, a display as illustrated in FIG. 8. When the print conditions are set using the printing setting screen and storing of the conditions is designated, the process is advanced to step S11, the contents set by using the menu screen are stored in the memory RAM 233 with respect to the respective modes. Thereafter, the step S11 is followed by the step S4.

On the other hand, it is determined in the step S7 that "instruct to set print conditions" is not selected, the process is advanced to step S12, and it is determined whether or not the item 3 "instruct to set print mode" has been selected. For example, this is done with the menu screen in FIG. 4, by moving a cursor 401 using the cursor key 201 on the operation panel 250, the item 3, i.e., "instruct to set print mode" is selected, as illustrated in FIG. 4. In this situation, when the SET key 202 (FIG. 2) is pressed, a mode-setting screen as illustrated in FIG. 5 is displayed on the television receiver 260 in the step S13.

Figure 5:
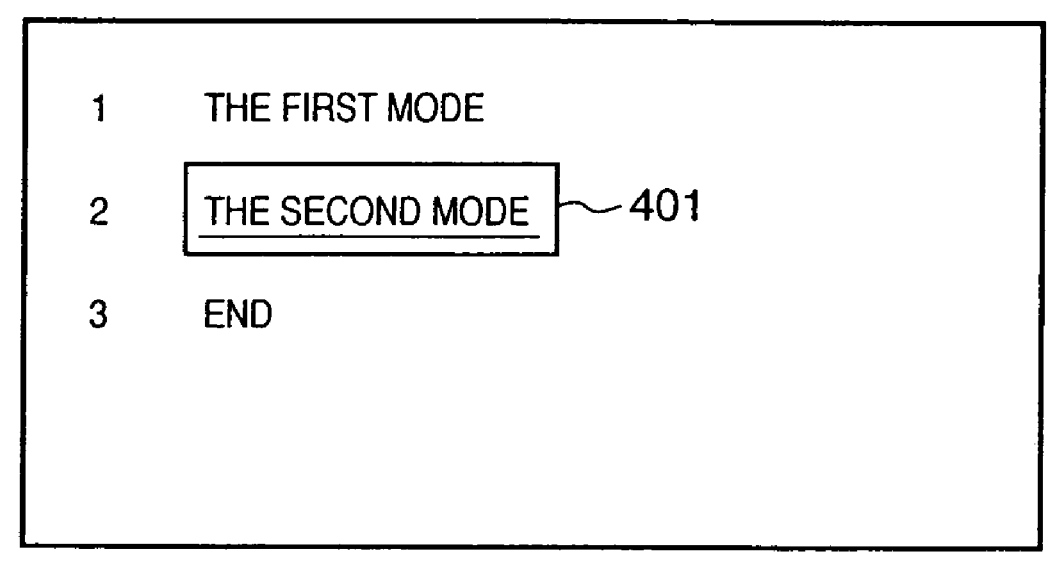

FIG. 5 depicts a view illustrating an example of the mode-setting screen.

In FIG. 5, either the first mode or the second mode can be selected. FIG. 5 shows a case where the second mode is selected by the cursor 401. In this situation, when the SET key 202 is pressed, the second mode is selected.

In the step S14, when the user selects the first or the second mode using the operation panel 250, the state of the printer is set to the selected mode. Thereafter, the process is advanced to step S4. In the example of FIG. 5, the second mode is selected, data received through the wireless interface 234 is temporarily displayed on the television receiver 260, and then the state of the printer is set to the mode in which the printer prints according to the print conditions set by using the screen of the television receiver 260.

When it is determined in the step S12 that "instruct to set print mode" is not selected, the step S12 is followed by the step S15, and it is determined whether or not the item 4, i.e., "terminate of menu", that terminates the setting processing utilizing the menu screen has been instructed. When "terminate of menu" has been instructed, the processing is terminated, however, such is not the case, the process is advanced to step S4, and the foregoing processing is implemented.

Figure 6:
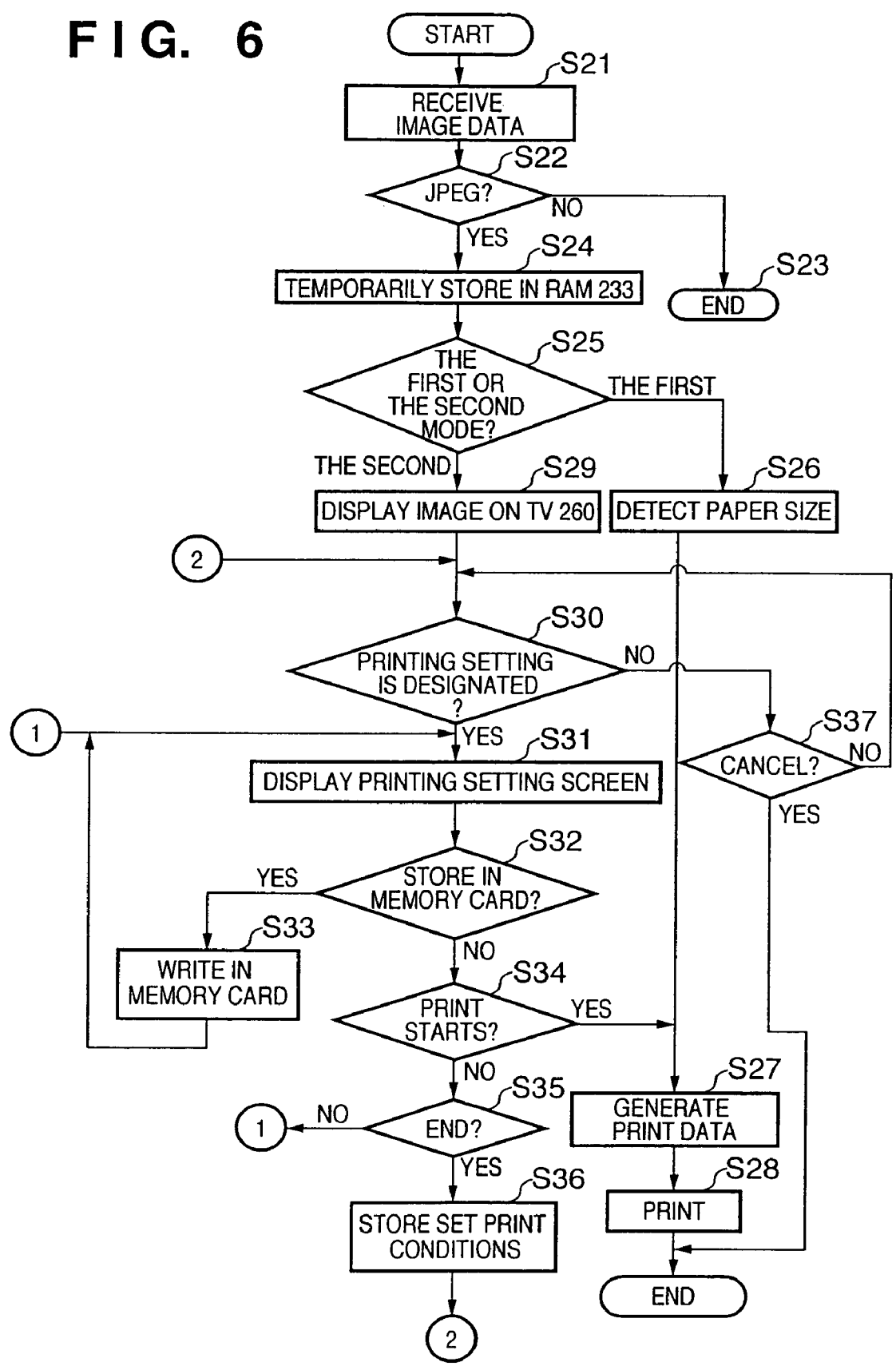
FIG. 6 is a flowchart for explaining the process of a printer according to the embodiment of the present invention.

FIG. 6 is a flowchart for explaining the print processing in the printer according to the embodiment of the present invention. In the embodiment, it is assumed that, by means of a file-swapping protocol over a wireless interface, such as OBEX, the file name to be received is notified, as agreement on the protocol, to the printer prior to the actual reception, and that the type of a file that is printable with the printer is JPEG-type. Program for implementing the processing is stored in the ROM 232 and implemented under the control of the MPU 231.

In the step S21, an image file is received through the wireless interface 234, the process is advanced to step S22, and it is determined whether or not the extension of the image file is "JPEG". If in the case where the extension of the image file is "JPEG", the process is advanced to step S24, by assuming that the imaging file can be processed. In the contrary case, the process is advanced to step S23 and is terminated by assuming that an error has occurred. In the step S24, the received image file is stored in an image-storing area of the RAM 233. Subsequently, in the step S25, it is determined whether the mode being set at the present time is the first mode or the second mode. If it is determined that the first mode is set, the process is advanced to step S26, and the size of the paper being set in the printer is detected. The detection of the paper size may be implemented, e.g., in such a way that, by making a reflection-type sensor provided on the carriage scan over the paper, the width of the paper is detected, and using the paper width, a standard size of the paper, such as an A4 size and an A6 size, may be determined. Alternatively, in the case of a printer having a front-paper-feeding/front-paper-ejecting type mechanism, i.e., a switchback-system paper feeding mechanism, the standard paper size, such as an A4 size and an A6 size, may be determined based on the paper length obtained while the paper is fed. Thereafter, the step S26 is followed by the step S27, the JPEG data that has been stored in the RAM 233 in the step S24 is decoded, and print data is generated based on the paper size obtained in the step S26 and the print quality that has been preliminarily stored as an initial setting in the ROM 232. In the step S28, print processing is implemented based on the generated print data.

In the case of a printer that does not have any paper-size detection mechanism, as is the case with the print quality, the detection of paper size in the step S26 may be replaced by utilizing the paper whose size is preliminarily set in the ROM 232 by default. Moreover, when the printer is designed to be able to store print parameters, such as a paper size and print quality, in the EEPROM 245 that is an electrically writable non-volatile ROM, the set information (conditions) with which the previous printing is implemented may be stored in the EEPROM 245.

Still moreover, by displaying, as illustrated in FIG. 8, a setting screen with which print parameters to be utilized in the first mode can be set using the television receiver 260 and the operation panel 250, in addition to the menu screen in FIG. 4, the set information set by a user using the setting screen may be stored in EEPROM 245.

Meanwhile, in the step S25, if it is determined that the mode second mode is set, the process is advanced to step S29, and the received JPEG image is decoded and converted into bitmap data. The converted image data is transferred to the video output controller 251 and displayed on the television receiver 260. Subsequently, in the step S30, the MPU 231 waits for the PRINTING SETTING key 203 of the operation panel 250 to be pressed. When the CANCEL key 204 is pressed, the processing ends in the step S37. In the step S30, it is determined that the PRINTING SETTING key 203 is pressed, the process is advanced to step S31, and a printing setting screen as illustrated in FIG. 7 which image is preliminarily stored in ROM 232, is sent to the video output controller 251 and displayed on the television receiver 260.

FIG. 7 depicts a view illustrating an example of the printing setting screen that is displayed on the television receiver 260 in the step S31. In addition, in this case, the menu screen is displayed being superimposed on a part of an image that has already been being displayed.

In this example, "paper size", "print quality", "print start", and "store in memory card" are designated. In "paper size", either one of the sizes "A4" and "A6" can be designated; in "print quality", either one of "High (high-quality image)" and "Normal (standard)" can be designated.

In the step S32, it is determined whether or not the item 4, i.e., "store in memory card" is selected, and if the item 4 is selected and then the process is advanced to step S33, and the image data that is being presently displayed on the television receiver 260 is stored in the memory card 261, and the process is advanced to step S31.

On the other hand, in the step S32, if "store in memory card" (the item 4) is not selected, the process is advanced to step S34, and it is determined whether or not the item 3 "print start" has been instructed. If the item 3 has been instructed, the process is advanced to step S27, and print data is created according to the paper size, the print quality and the like that have been set in the second mode. In the step S28, then the print processing is implemented.

If it is determined in the step S34 that "print start" has not been instructed, the process is advanced to step S35, and it is determined whether or not the item 5 of the menu screen, i.e., "end" is instructed. If "end" is instructed, the process is advanced to S36, and the print conditions are decided based on the desired print size and the print quality that the user has selected by operating the operation panel 250, while viewing the displayed menu screen, and the decided print conditions are stored in the memory (EEPROM 245). Thereafter, the process is advanced to step S30.

In the above described embodiment, the printer is designed in such a way that, after the image data received via the wireless interface 234 is displayed on the television receiver 260, the image data can be stored in the memory card 261 mounted in the printer by providing the item "store in memory card" in the screen illustrated in FIG. 7. However, the present invention is not limited to the foregoing example. For example, a STORE key may be provided in the operation panel 250.

FIG. 8 depicts a view illustrating an example of the print-parameter-setting screen that is used in the first mode.

In this example, "paper size", "print quality", "print start", and "store" can be instructed. In "paper size", either one of the sizes "A4" and "A6" can be set; in "print quality", either one of "High (high-quality image)" and "Normal (standard)" can be designated. In addition, when "store" is instructed, the set print conditions are stored in the EEPROM 245.

As described above, the object of the present invention can also be achieved, by providing a system or an apparatus with storage media in which program codes of the software that realizes the functions of the present embodiment are recorded, and by making the computer (alternatively, CPU or MPU) of the system or the apparatus read out and implement the program codes stored in the storage media. In this case, the program codes themselves that are read out from the storage media realize the functions of the foregoing embodiment; therefore, the storage media in which the program codes are stored constitute the present invention. As a storage medium for providing such program codes, for example, a floppy Disk™, a hard disk, an optical disk, a magneto optical disk, a CD-ROM, a CD-R, a magnetic tape, a nonvolatile memory card, a ROM, and or the like can be employed.

The present invention also includes the case where the foregoing functions of the embodiment are realized, not only by making a computer implement the read-out program codes, but also by making an OS (operating system), or the like, that operates on the computer implement part of or all of the actual processing, based on the instructions of the program codes.

Moreover, the present invention also includes the case where, by storing the program codes read out from the storage media in a memory equipped in a function-enhancing board inserted into the computer, or in a function-enhancing unit connected to the computer, and then by making a CPU or the like, equipped in the function-enhancing board or the function-enhancing unit, implement part of or all of the actual processing, based on the instructions of the program codes, the foregoing functions of the embodiment are realized.

As described above, according to the embodiment, image data sent through a wireless interface from a mobile terminal, a digital camera, or the like, can be printed even when no display apparatus such as a television receiver is connected to the printer.

Still moreover, the embodiment can provide a printer that can print with various types of print modes being set, in the case where a display apparatus is connected thereto.

As many apparently widely different embodiments of the present invention can be made without departing from the spirit and scope thereof, it is to be understood that the invention is not limited to the specific embodiments thereof except as defined in the appended claims.

CLAIM OF PRIORITY

This application claims priority from Japanese Patent Application No. 2004-167590 filed Jun. 4, 2004, which is hereby incorporated by reference herein.

What is claimed is:

1. A printing apparatus comprising:
   a determination unit configured to determine whether a display apparatus is connected to the printing apparatus;
   a reception unit configured to receive image data from an external apparatus different from the display apparatus, wherein the reception unit receives the image data even if the determination unit determines that the display apparatus is not connected;

a memory unit configured to store a print condition to be set for the printing apparatus for printing of the image data received by the reception unit;

a mode setting unit configured to set a first mode in which the printing apparatus prints an image in accordance with the print condition stored in the memory unit, and then, if the determination unit determines that the display apparatus is connected, to cause the display apparatus to display a mode-setting screen and to set, in accordance with an instruction by a user using the mode-setting screen, the first mode or a second mode in which the printing apparatus prints an image in accordance with a print condition set by the user, the print condition set by the user not being the print condition stored in the memory unit;

a display control unit configured to cause the display apparatus to display the print condition stored in the memory unit when the determination unit determines that the display apparatus is connected and the mode setting unit sets the first mode, and to cause the display apparatus to display a print setting screen for setting the print condition in the second mode when the mode setting unit sets the second mode; and a print unit configured, if the printing apparatus is operating in the first mode, to print an image on a recording medium based on the image data received by the reception unit in accordance with the print condition stored in the memory unit, and, if the printing apparatus is operating in the second mode, to print the image in accordance with the print condition set using the print setting screen displayed by the display apparatus.

2. The printing apparatus according to claim 1, wherein the display apparatus includes a television receiver.

3. The printing apparatus according to claim 1, wherein the first mode is selected when an electric power supply of the printing apparatus is turned ON.

4. The printing apparatus according to claim 1, further comprising a size detecting unit configured to detect a size of the recording medium, wherein, if the printing apparatus is operating in the first mode, an image is printed according to the size of the recording medium detected by the size detecting unit.

5. The printing apparatus according to claim 1, further comprising a card interface unit configured to mount and provide access to a memory card, wherein, if the printing apparatus is operating in the second mode, the image data received by the reception unit is stored in the memory card by the card interface unit.

6. The printing apparatus according to claim 1, wherein the display control unit outputs the image data received by the reception unit to the display apparatus connected to the printing apparatus, if the determination unit determines that the display apparatus is connected to the printing apparatus, and causes the display apparatus to display an image based on the image data.

7. The printing apparatus according to claim 1, further comprising an operation unit operated by the user, wherein the print condition setting unit sets the print condition based on a print setting designated by the user using the operation unit.

8. The printing apparatus according to claim 1, wherein the determination unit determines whether a display apparatus is connected to the printing apparatus when an electric power supply of the printing apparatus is turned ON.

9. The printing apparatus according to claim 1, wherein the mode setting unit sets the first mode or the second mode when an electric power supply of the printing apparatus is turned ON.

10. The printing apparatus according to claim 1, further comprising a storing unit configured to store the print condition into the memory unit, when the determination unit determines that the display apparatus is connected and the mode setting unit sets the first mode, wherein, when the printing apparatus is operating in the first mode, the print unit prints the image on the recording medium in accordance with the print condition that is stored in the memory unit by the storing unit.

11. A control method performed by a printing apparatus having a memory unit storing a print condition for printing image data, the method comprising:

determining whether a display apparatus is connected to the printing apparatus;

receiving image data from an external apparatus different from the display apparatus, wherein image data is received even if a determination is made that the display apparatus is not connected;

setting a first mode in which the printing apparatus prints an image in accordance with the print condition stored in the memory unit, and then, if a result of the determining indicates that the display apparatus is connected, causing the display apparatus to display a mode-setting screen, and setting, in accordance with an instruction by a user using the mode-setting screen, the first mode or a second mode in which the printing apparatus prints an image in accordance with a print condition set by the user, the print condition set by the user not being the print condition stored in the memory unit;

causing the display apparatus to display the print condition stored in the memory unit when a result of the determining indicates that the display apparatus is connected and the first mode is set, or causing the display apparatus to display a print setting screen for setting the print condition in the second mode when the second mode is set; and if the first mode is set, printing an image on a recording medium based on the image data in accordance with the print condition stored in the memory unit, and, if the second mode is set, printing the image in accordance with the print condition set using the print setting screen.

12. The method according to claim 11, wherein the display apparatus includes a television receiver.

13. The method according to claim 11, wherein the printing apparatus is operated in the first mode when an electric power supply of the printing apparatus is turned ON.

14. The method according to claim 11, further comprising detecting a size of the recording medium, wherein, if the first mode is set, an image is printed according to the size of the recording medium detected.

15. The method according to claim 11, further comprising storing image data received into a memory card mounted to the printing apparatus, if the second mode is set.

* * * * *